(No Model.) 2 Sheets—Sheet 2.
L. C. CAMP.
MACHINE FOR TRIMMING AND CRIMPING THE EDGES OF PIE CRUST.
No. 260,369. Patented July 4, 1882.
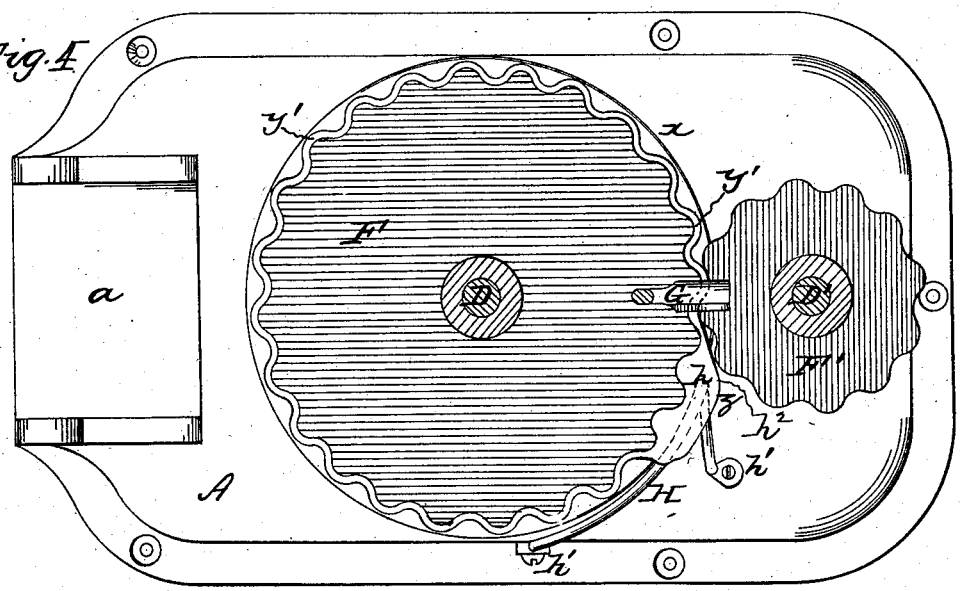
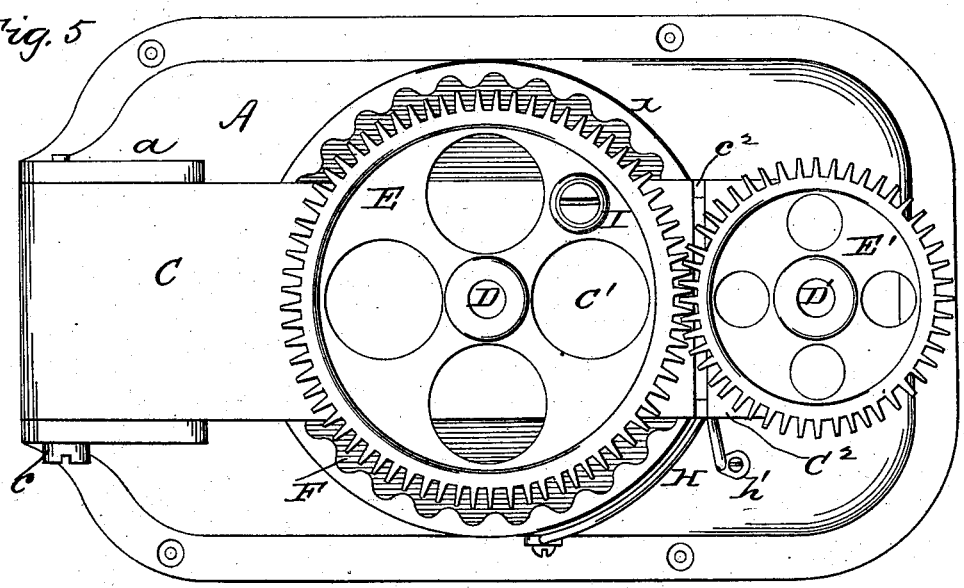

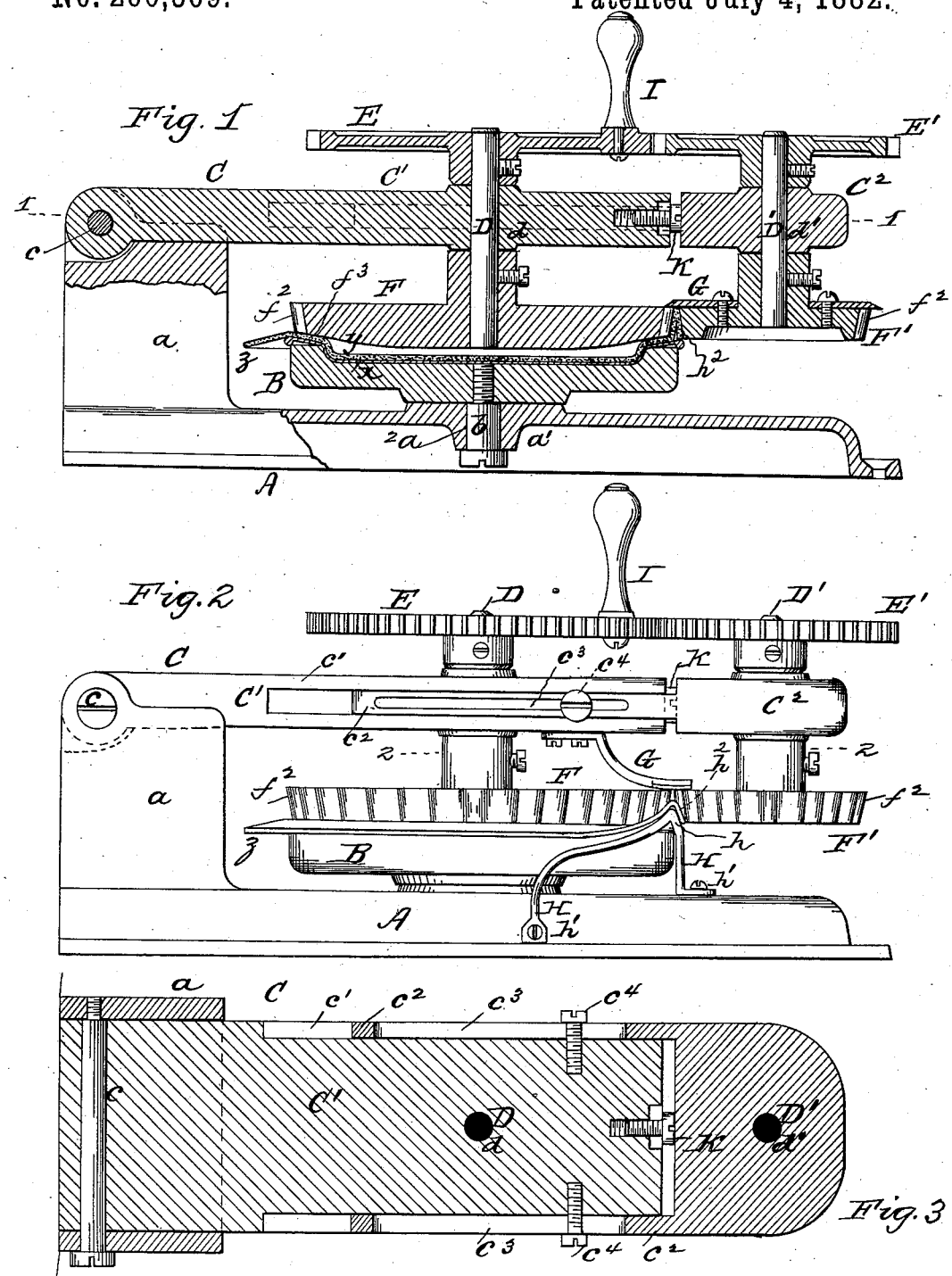

UNITED STATES PATENT OFFICE.

LYMAN C. CAMP, OF PHILADELPHIA, PENNSYLVANIA.

MACHINE FOR TRIMMING AND CRIMPING THE EDGES OF PIE-CRUST.

SPECIFICATION forming part of Letters Patent No. 260,369, dated July 4, 1882.

Application filed May 1, 1882. (No model.)

*To all whom it may concern:*

Be it known that I, LYMAN C. CAMP, a citizen of the United States, residing at Philadelphia, in the county of Philadelphia and State of Pennsylvania, have invented certain new and useful Improvements in Machines for Trimming and Crimping the Edges of Pie-Crust, of which the following is a specification, reference being had therein to the accompanying drawings, wherein—

Figure 1 is a longitudinal vertical section of a machine embodying my improvements. Fig. 2 is an elevation. Fig. 3 is a section on the line 1 1, Fig. 1. Fig. 4 is a section on line 2 2, Fig. 2. Fig. 5 is a plan.

My machine has for its object to provide a machine for trimming and setting or crimping the edge of the crust of pies; and it consists in the novel combination, construction, and arrangement of parts hereinafter specifically described and claimed.

Referring to the accompanying drawings, A represents the base of the machine, having a bracket, $a$, and a lug, $a'$, with circular opening $a^2$ for the passage of the pin or shaft $b$ of the pie-pan holder B.

C represents an arm hinged or pivoted at $c$ to bracket $a$. The arm C is composed of two parts or members, $C'$ and $C^2$, which are connected to each other by means of the ways or guides $c'$ and tongues $c^2$. The latter are slotted at $c^3$, and $c^4$ are set-screws passing through said slots $c^3$. The screws $c^4$ engage with part $C'$ to secure it and the part $C^2$ rigidly together. By loosening the set-screws $c^4$ the part $C^2$ may be moved lengthwise to and from the part $C'$, for the purpose hereinafter described.

The parts $C'$ and $C^2$ are respectively formed with journal-bearings $d$ $d'$ for the vertical shafts D D'. The shaft D carries at its upper end a cog-wheel, E, and at its lower end a crimping-disk, F. The shaft D' is provided at its upper extremity with a gear-wheel, E', which meshes with wheel E, and at its lower end with a crimping-disk, F', which aligns with and is designed to operate in unison with the disk F. The edges or peripheries of said disks are corrugated in any desired or suitable manner, as shown at $f^2$, and they taper downwardly to provide draft therefor, in order to permit said disks to be readily removed from or raised out of the dough, so as not to break down the crimped edge of the pie-crust.

H represents the crust or dough folder, which may consist of a wire having a bend, $h$. Said wire is secured to base A at $h'$ $h'$ in such manner that its bend $h$ will be adjacent to the periphery of and project above the holder B in front of the junction of the crimping-disks F F'; or, if desired, said folder may be made substantially like the hemmer of a sewing-machine, or of any other suitable or desired form.

G represents the crust-trimming knife, which, if desired, may be circular in outline and secured to disk F, as shown in Fig. 1; or it may be a piece of bent steel and secured to the arm C, as shown in Fig. 2, the knife G in either case being arranged to overlap the line of junction of the crimping-disks, as illustrated, so that any dough forced up between said disks is cut or trimmed off by said knife.

The operation is as follows: The arm C, with crimping wheels or disks F F', is first raised on its hinge or pivotal point $c$. The pie-pan $x$, with crust $y$ laid therein, is then placed in the holder B. The crust $y$ is made large enough to extend beyond or overlap the edge of the pan, as shown at $z$. The bend $h$ of folder H is beneath and in line with the overlap $z$, so that the latter rests on the bend $h$. When the arm C is lowered the under surface of crimping-disk F impinges upon crust $y$, as shown at $f^3$, Fig. 1. Said disk therefore acts as a clamp for holding the crust firmly to the pan during the crimping and trimming operation, and it also causes the holder B, with pie pan and crust, to revolve when the shaft D is rotated by turning the handle or crank I, attached to wheel E. During such revolution the overlap $z$ of the crust is doubled or folded up as it passes over the bend $h$ of folder H, as plainly shown at $h^2$, Fig. 2, said folding operation taking place immediately in advance of the crimping-disks, so that when the folded edge enters between the disks their corrugated peripheries crimp or set said edge, as shown at $y'$. Any surplus dough forced up between the disks F F' is trimmed off by the knife G. When the edge of the pie-crust is crimped and trimmed the arm C is raised. The taper or draft of the crimping-disks permits the latter to leave the dough or the crimped edge thereof without mutilating or breaking down the same. The pan, with its crimped pie-crust, is then removed, and is replaced by a fresh one, to be treated in like manner. The disks F F' are adjusted to and from each other to suit varying thicknesses of pie-crust to be crimped. Such adjustment is made by sliding the part $C^2$ to and from the part C', and, if desired, a set-screw, K, may be inserted in the end of part C' to determine the extent of such adjustment. The cogs of the wheels E E' are of such length that they will always mesh with each other when such adjustment of the disks is made.

It will be noticed that the disk F not only acts as a crimping-wheel and a clamp for holding the pie-crust to the pan, but also effects a revolution of the crust, pan, and holder B during the trimming and crimping operation. Hence said disk may be used as a clamp to rest upon the upper crust of double-crusted pies and cause the same to revolve with it, in order that the edges of such pies may be trimmed. When so employed the part $C^2$ of arm C is dispensed with, and the knife G is so arranged, either by securing it to base A or arm C, that its cutting-edge will bear against the beaded edge of the pie-pan. In such case the disk F may be concaved on its under side instead of convex, as shown in the drawings.

What I claim as my invention is—

1. In a pie-machine, a frame having a pie-holder, and a revolving shaft to which is secured a clamp or disk to rotate with said shaft, and in combination therewith a trimming-knife and mechanism, substantially as shown and described, for effecting an engagement of said clamp and holder to cause the latter to revolve with said clamp, substantially as and for the purpose set forth.

2. In a pie-machine, the combination of base or frame A, holder B, arm C, shafts D D', crimping-wheels F F', trimming-knife G, folder H, and means for effecting a revolution of the shafts D D', substantially as shown and described.

3. In a pie-machine, the combination, with a pie-holder, of two crimping-disks, F F', with operating mechanism therefor, and knife or trimmer G, substantially as shown and described.

4. In a pie-machine, the combination of the following elements: a pie-holder, a knife or trimmer, a dough or crust folder, crimping or setting disks, and mechanism for rotating said disks simultaneously, substantially as shown and described.

5. In a pie-machine, the combination of a pie-holder, a trimming-knife, a dough or crust folder, and two crimping-disks, and mechanism for adjusting them to and from each other, with mechanism for effecting a revolution of said disks, substantially as shown and described.

6. The combination of holder B, arm C, composed of two members, C' and $C^2$, adjustably secured together, shafts D D', carrying crimping-disks F F', and mechanism for effecting their rotation, a trimming-knife, G, and holder H, substantially as shown and described.

7. In a pie-machine, the combination, with holder B, the pivoted arm C, composed of parts C' and $C^2$, adjustably secured together, the disks F F', corrugated at $f^2$, knife or trimmer G, folder H, and means for effecting a simultaneous revolution of said disks, substantially as shown and described.

In testimony whereof I affix my signature in presence of two witnesses.

LYMAN C. CAMP.

Witnesses:
S. J. VAN STAVOREN,
CHAS. F. VAN HORN.